UNITED STATES PATENT OFFICE.

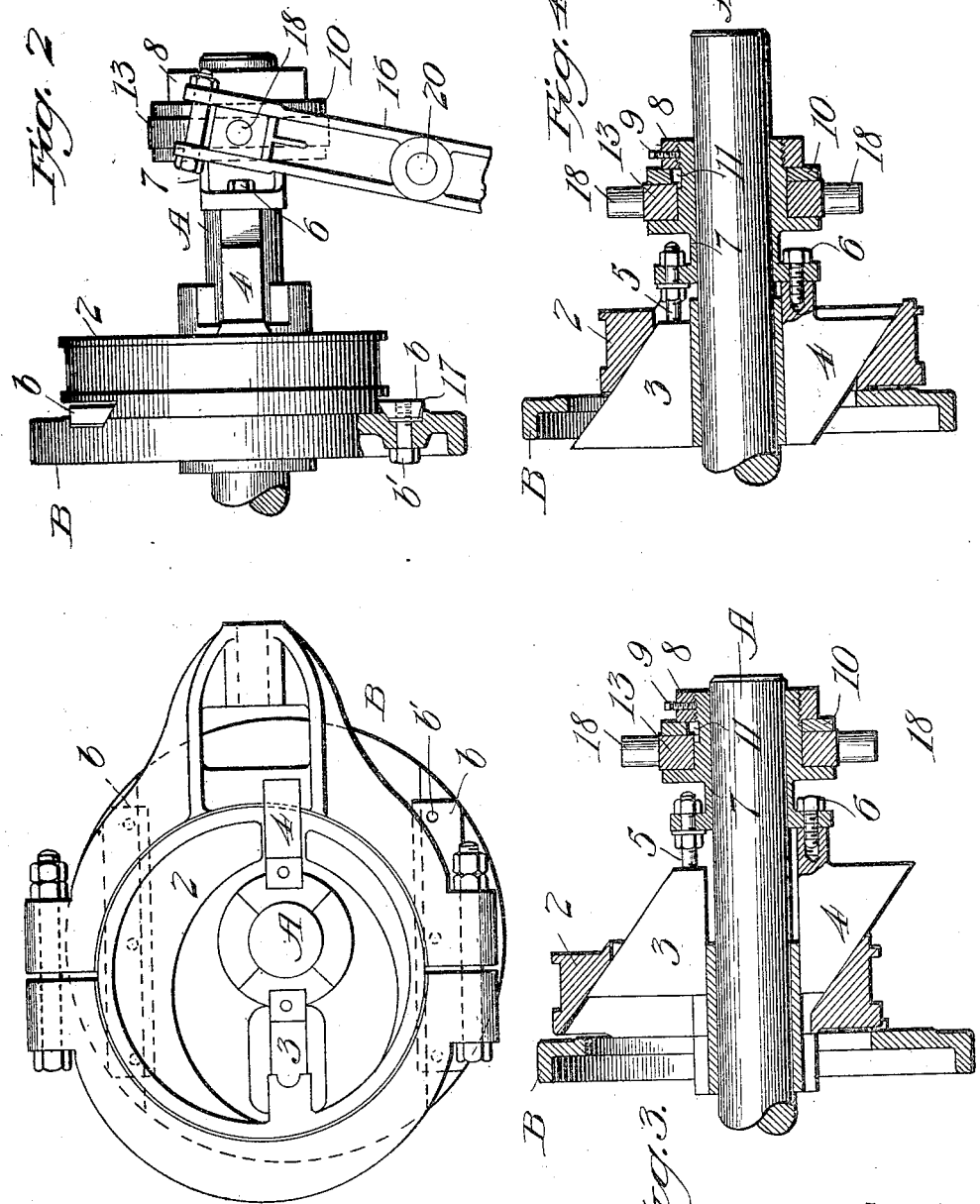

SAMUEL E. BEELER, OF WAYNESBORO, PENNSYLVANIA, ASSIGNOR TO FRICK COMPANY, OF WAYNESBORO, PENNSYLVANIA, A CORPORATION.

STEAM-ENGINE REVERSE.

1,123,070.

Specification of Letters Patent. Patented Dec. 29, 1914.

Application filed June 24, 1911. Serial No. 635,198.

*To all whom it may concern:*

Be it known that I, SAMUEL E. BEELER, a citizen of the United States, residing at Waynesboro, in the county of Franklin and State of Pennsylvania, have invented certain new and useful Improvements in Steam-Engine Reverse, of which the following is a specification.

My said invention consists in various improvements in the details of construction and arrangement of parts of steam engine reverse mechanism whereby such a mechanism is provided which may be readily adjusted to secure the proper lead and motion of the valve and also one wherein compensation for wear between all the parts is provided so that the mechanism will at all times run true and steady but at the same time free from binding or undue friction, all as will be hereinafter more fully described and claimed.

Referring to the accompanying drawings which are made a part hereof and on which similar reference characters indicate similar parts, Figure 1 is an end view of the crank-shaft and parts thereon showing the reverse disk, which carries the eccentric, in side elevation, Fig. 2 a top or plan view, Fig. 3 a central longitudinal section through the reverse mechanism, the end of the crank-shaft on which it is mounted being shown in elevation, and Fig. 4 a similar view showing the parts in reversed position.

In said drawings the portions marked A represent the crank-shaft and B the reverse disk. Said crank-shaft is, or may be, a crank-shaft of an ordinary steam engine and the disk B is mounted thereon in the usual, or any approved manner. On the outer face of said disk B is mounted an eccentric 2 being secured to slide transversely thereon by means of guides $b$. Said guides $b$ are secured to the face of said disk by means of bolts $b'$ and are formed with their adjacent edges cut under, or tapered from their outer edges away from each other to the face of disk B. Said edges are engaged by correspondingly tapered and parallel edges of a base on eccentric 2. Said eccentric is formed with a central transverse recess the opposite edges of which extend at an angle with the axis of the crank but parallel with each other as indicated most clearly in Figs. 3 and 4. Gibs 3 and 4 are mounted on opposite sides of the axis of the shaft A and formed with their outer edges tapered correspondingly to the taper of the recess in the eccentric 2 and adapted to fit therein. Said gibs are connected to a sliding sleeve 7, gib 3 by an adjusting bolt 5 and gib 4 by a machine bolt 6. A shifting yoke 13 is mounted on the sliding sleeve 7 between a flange formed on one side thereof and a nut 8 mounted on the outer end thereof. Said nut 8 is secured in adjusted position by means of a set-screw 9 and a washer 10 secured to turn with sleeve 7 by means of a key 11 is mounted between nut 8 and the side of yoke 13. By this means the nut 8 may be turned any degree desired for securing a close working fit between the flange of sleeve 7 and the washer 10 and be then locked in such position, thus providing means to readily take up any wear between the parts and insure a close adjustment at all times.

The wear between the gibs 3 and 4 and the bearing faces in the recess in eccentric 2 is taken up by adjusting gib 3 through the medium of the adjusting stud, or bolt, 5, which is connected to a flange of sleeve 7 by a nut on both sides of said flange as shown. A reversing lever 16 with a forked end is mounted on a fulcrum 20 and engages the radial pins 18 of yoke 13, for operating the said sliding sleeve.

As will be readily understood, the position of eccentric 2 on disk B is determined by the gibs 3 and 4 and may be changed from any position between that shown in Fig. 3 to that shown in Fig. 4 by sliding said gibs, as indicated, through the medium of lever 16. When the eccentric is in the extreme position shown in Fig. 3, the steam valve will have the proper lead and motion for running the engine in one direction, while when it is in the extreme position shown in Fig. 4, it will have the proper lead and motion for running the engine in the opposite direction. Less travel of the valve and a consequent earlier cut-off is obtained by adjusting eccentric 2 to a position between these extremes, as may be determined, to secure the desired result.

Adjustment to compensate for wear between eccentric 2 and guides $b$ is provided by means of liners 17 mounted beneath said guides. It will be noted by reference to Fig. 2 that there is sufficient clearance between the outer face of the guides $b$ and the adjacent face of the base of the eccentric so that one or more of the liners 17 may be removed from beneath one of the guides $b$ and placed beneath the other guide $b$, and the eccentric thus moved slightly across the face of disk B, at right angles with the guides $b$, and thus adjustment of a fixed character provided to regulate the amount of "lead" for the valve, as may be desired.

Having thus fully described my said invention, what I claim as new and desire to secure by Letters Patent, is:

1. A reverse mechanism for steam engines comprising an eccentric shaft, a disk thereon, a pair of guides on one face of said disk disposed on opposite sides of its axis and formed with their adjacent edges tapered to overhang the face of said disk, liners interchangeably mounted between said guides and their seats on said disk, an eccentric mounted on said guides and formed with tapered parallel edges adapted to engage the tapered edges of said guides and to slide thereon transversely across the face of said disk, a recess through said eccentric with its opposite edges tapered in relation to the axis of the shaft but parallel with each other, sliding gibs mounted on opposite sides of said shaft with their outer edges tapered corresponding to the tapered edges of said recess in said eccentric, a sliding collar on said shaft, a connection between said sliding collar and said gibs, one of said connections being fixed and the other connection adjustable, a shifting yoke mounted on said collar between a fixed flange and an adjustable washer, a nut on the outside of said washer for adjusting the same in relation to the fixed flange, means for locking said nut in adjusted position, and a shifting lever for operating said sliding sleeve, substantially as set forth.

2. In a steam engine reverse mechanism, the combination with the eccentric shaft, of a disk secured thereon, a transversely adjustable eccentric on said disk, a pair of guides secured on one face of said disk disposed on opposite sides of its axis on which said eccentric is mounted to slide, said guides and said eccentric being formed with inter-engaging tapered edges, liners interchangeably secured between said guides and their seats on said disk and arranged to be transferred from one side to the other of the axis of said disk for adjusting said eccentric at right angles to said guides, and means for adjusting said eccentric longitudinally on said guides, substantially as set forth.

In witness whereof, I have hereunto set my hand and seal at Waynesboro, Pennsylvania this 19 day of June, A. D. nineteen hundred and eleven.

SAMUEL E. BEELER. [L. S.]

Witnesses:
S. J. MIDDLETON,
E. P. WINE.

Copies of this patent may be obtained for five cents each, by addressing the "Commissioner of Patents, Washington, D. C."